INVENTORS
ROGER E. ABERNATHY
HELLMUTH R. GENG
WALTER N. ONWILER
ROBERT TARANTO

BY Robert W. Berray
ATTORNEY

United States Patent Office 3,394,249

Patented July 23, 1968

3,394,249

APPARATUS FOR ADDING NUMBERS USING A DECREMENTER AND AN INCREMENTER

Roger E. Abernathy, Stuttgart-Ost, Hellmuth R. Geng, Schoniach, Walter N. Onwiler, Boblingen, and Robert Taranto, Sindelfingen, Germany, assignors to International Business Machines Corporation, Armonk, N.Y., a corporation of New York Filed Sept. 29, 1965, Ser. No. 491,219
Claims priority, application Germany, Nov. 5, 1964, J 26,818
4 Claims. (Cl. 235—177)

ABSTRACT OF THE DISCLOSURE

An adding apparatus consisting of two counters, each of which is set to contain the binary numbers to be added which includes logic means to determine which of the two numbers is closest to either the upper or lower limit of the counting capacity and in response to this determination to cause one counter to be incremented and the other counter to be decremented or vice versa.

For the additive combination of two numbers (augend and addend) a method is already known by which the numbers, which are contained in two operand registers, are each subjected to a counting process. In that process, the value of the addend contained in the second operand register is increased by one while the value of the augend contained in the first operand register is decreased by one. This process is repeated until the value in the first operand register is overdrawn for the first time. The result in then contained in the second operand register. A circuit arrangement operating according to this method is unsuited for high speed adding processes. If it is assumed that the augend register K contains the decimal number nine and the addend register L contains the decimal number two, the result can only be produced after nine process steps. Similar considerations apply also to known subtracting methods.

It is therefore an object of the present invention to provide apparatus which, independently of the number of digits in the numbers and of the radix of the numerical system, produces the result of an addition in a minimum of time.

It is an additional object of this invention to provide apparatus for adding two operands wherein either operand can be incremented while the other is decremented to thereby obtain a sum with the least number of cycles. These and other objects of the invention are realized in apparatus for adding two $n$- and $m$-digit numbers (augend and addend) represented in any desired numerical system of the radix B and stored in registers, counters or similar units.

In a preferred embodiment of the invention to be fully described, the content of one register having $n$ digits in the radix used is examined as to whether its content is either $$>\frac{B^n}{2}-1 \text{ or } <\frac{B^n}{2}$$

that furthermore for a value $$>\frac{B^n}{2}-1$$

the value of the one register is repeatedly increased by one and the value of the other register is repeatedly decreased by one and, for $$<\frac{B^n}{2}$$

the value of the one register is repeatedly decreased by one and the value of the other increased by one until the value zero is detected in one of the registers, whereupon the result will be contained in the other register. If the value zero has been first detected in the one register the result will be in the other register while inversely the result will be contained in the one register if the value zero has been first detected in said other register.

In another embodiment of the invention the contents of the augend and addend registers are compared and examined as for which content is closer to the numerical limits $B^0$ or $B^n$; that further, depending on the result of this examination, the value of that register which is the closest approach to one of these limits is, depending on whether the value was closer to the upper ($B^n$) or to the lower ($B^0$) limit, either increased or decreased by one while the respectively other register is at the same time decreased or increased by the value one, a sufficient number of times until in that register the value of which was closest to one of said limits the value zero is detected and thus the result is represented in the other register.

The foregoing and other objects, features, and advantages of the invention will be apparent from the following more particular description of a preferred embodiment of the invention, as illustrated in the accompanying drawings.

As has already been mentioned in the introduction above, the essential gist of this invention consists in the possibility of carrying out the addition or subtraction of two numbers with a minimum of operational steps. Thus, it is material for the speed at which such an operation can be performed, if in the addition of the two numbers nine and two, the result can be formed after two steps of operation instead of after nine steps of operation. The optimum solution to this problem is reached when an examination is made as to which of the operands is closest to the limiting numbers of any numerical radix. When using a numerical system with the radix 10, the value three is closer to the limiting value one than the number five, and the number nine is closer to the limiting value 10 than the number seven, and finally the number two is closer to the limiting number one than the number seven is to the limiting number 10. By considering this knowledge in the addition or subtraction of two operands, it is possible to form the result in an optimum number of steps.

Figure 1:
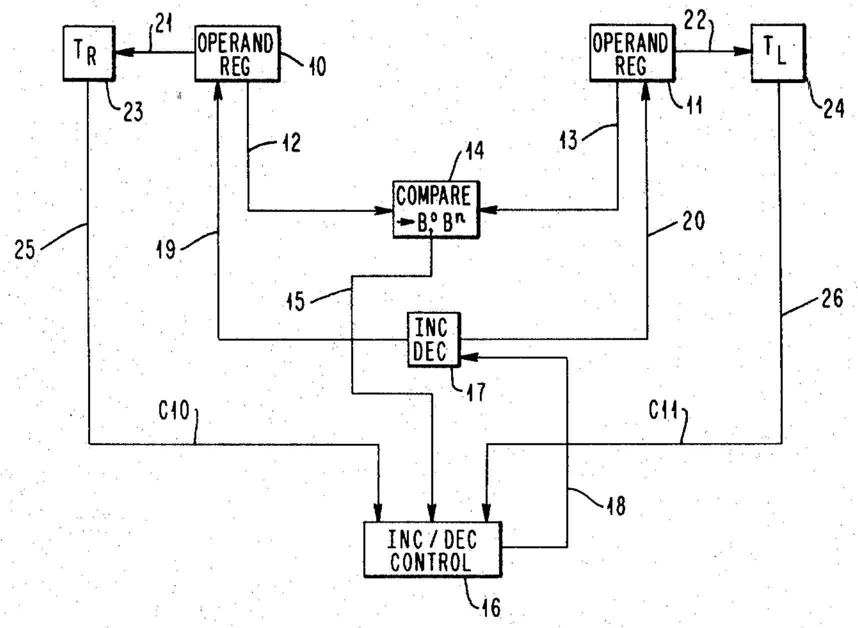
FIGURE 1 shows a block diagram illustrating the major components for adding and/or subtracting two operands according to this invention.

FIGURE 1 illustrates the block circuit diagram of an arrangement in which the method of the optimum number of steps is utilized in forming the result of the addition or subtraction of two numbers. Initially, two operand registers 10 and 11 are provided into which the operands to be combined are entered prior to the start of the arithmetic operation. For the illustrated block circuit diagram, it is immaterial which radix is chosen for the numerical system used. Through the parallel buses 12 and 13, the contents of the registers are available also at the comparer 14. In the comparer 14 the operands are examined to determine if either is equal to zero, or if neither is equal to zero, which value is closer to the lower numerical limit $B^0$ or closer to the upper numerical limit $B^n$. Control signals from comparer 14 will be sent via a bus 15 to an incrementer/decrementer control 16. When the value zero is detected in one register, e.g., in register 10, the other register, in this case register 11, already contains the result which will be indicated by the control 16. No further operations are required thereafter.

If, however, a register contains a value other than zero, that register which contains a value closest to one of the aforementioned numerical limits is modified in such a manner that, if it is closer to the upper limit, it is repeatedly increased by one until a carry takes place or, if it is closer to said lower limit, it is decreased by one a sufficient number of times until also a carry takes place. Simultaneously with the increase or decrease of this register by one, the content of the other register is increased or decreased by one in the reverse order.

Either register 10 or 11 may be incremented while the other is decremented by an incrementer/decrementer 17 energized by bus 18 from the control 16. The incrementer/decrementer 17 need be of no special form. If registers 10 and 11 are capable of bidirectional counting, count-up or count-down pulses can be applied by buses 19 or 20. Incrementer/decrementer 17 may be in the form of parallel logic which may receive the contents of either register 10 or 11 and transmit back a value increased by one or decreased by one.

The fact that either register has been stepped until the value zero is reached may be detected by noting when a carry or borrow is produced from the highest digit. Triggers 23 and 24 are provided as a one digit extension of the number in registers 10 and 11. These triggers will be set when the associated number is incremented through the upper limit or decremented with the content equal to zero. The carry or borrow to set triggers 23 or 24 is transmitted by lines 21 and 22 respectively. The output of triggers 23 and 24 labeled C10 and C11 respectively is connected via lines 25 and 26 to control 16. The presence of a carry signal from either register 10 or 11 signals the end of the incrementing and decrementing and designates which register contains the result.

Figure 2:
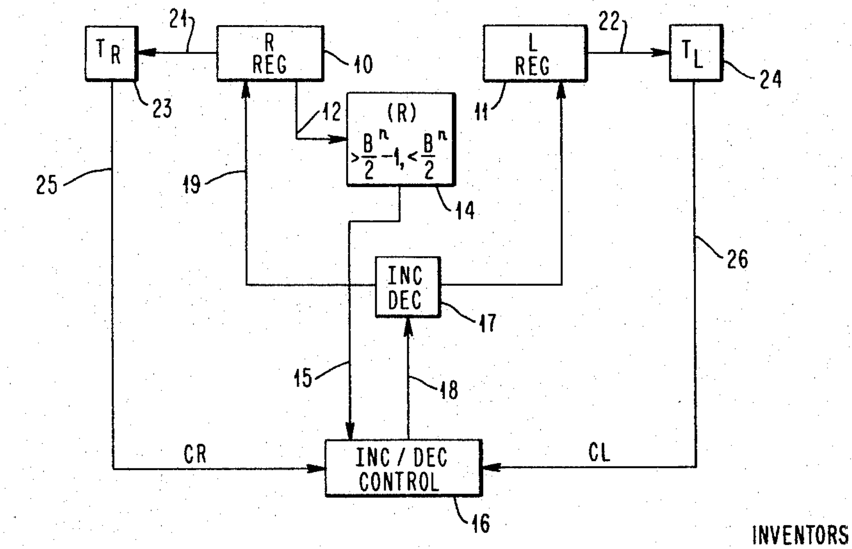
FIGURE 2 shows the block circuit diagram of an adding circuit wherein only one operand is compared to upper and lower limits of the number system used.
Figure 3:
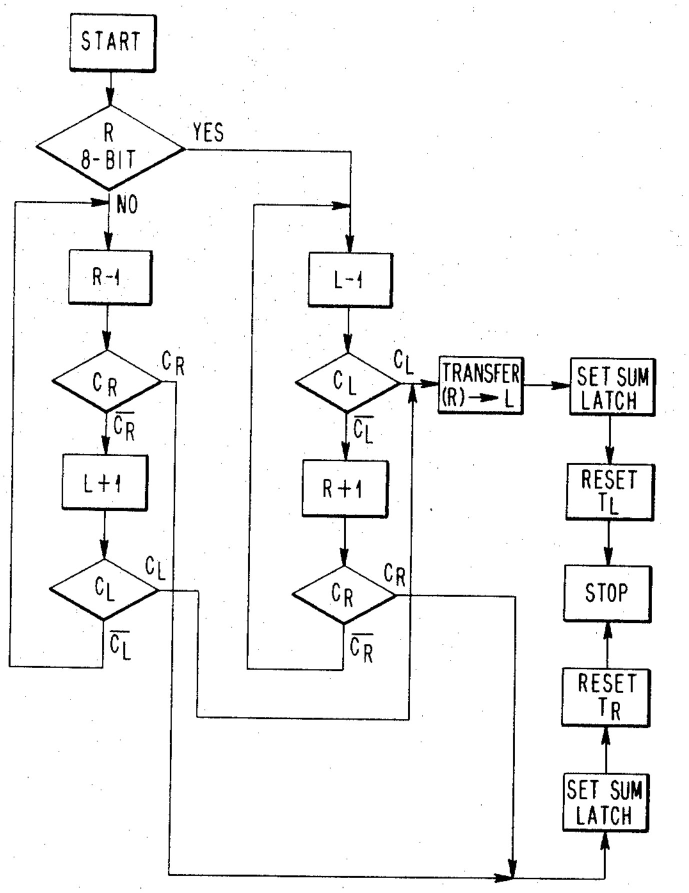
FIGURE 3 represents the sequence of operation for an arrangement according to FIGURE 2.
Figure 4:
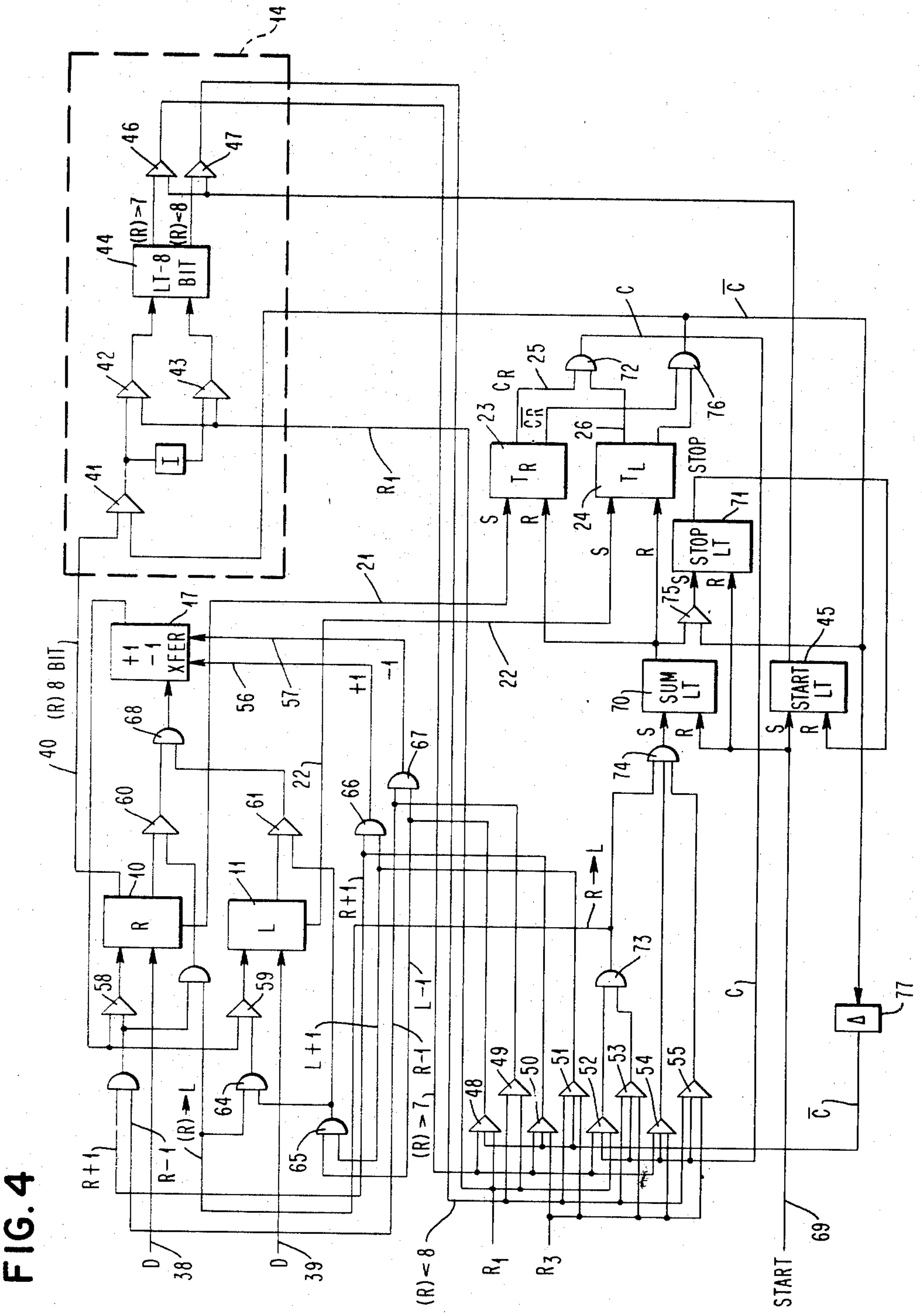
FIGURE 4 is a detailed logic diagram of the arrangement according to FIGURE 2.
Figure 5:
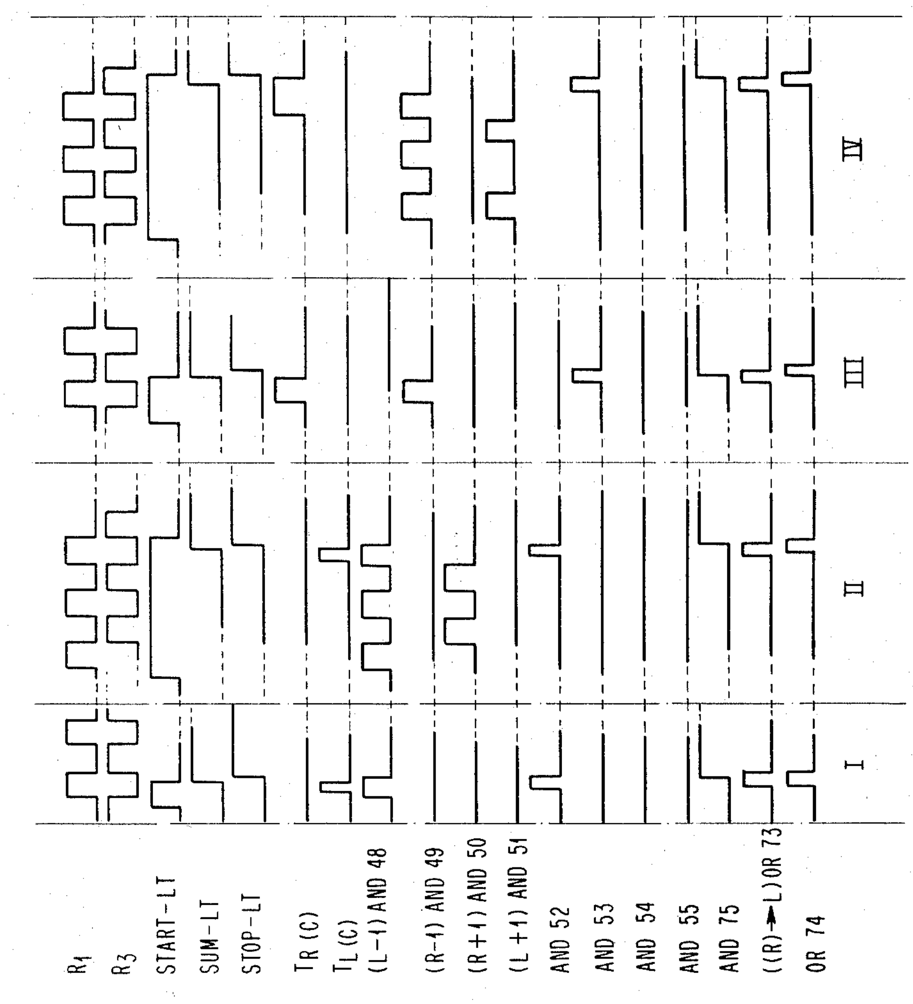
FIGURE 5 shows the pulse diagram of an arrangement according to FIGURE 4.

FIGURES 2 through 5 will be described in detail as to a preferred embodiment of the invention easily implemented. FIGURE 3 shows the sequence of operation for an arrangement according to the block diagram of FIGURE 2. In connection with FIGURE 2, registers 10 and 11 will be referred to as R register and L register respectively. The output of carry triggers 23 (TR) and 24 (TL) will be designated CR and CL respectively. The major lines and boxes corresponding to those of FIGURE 1 have been similarly labeled. Details of the entire apparatus are shown in FIGURE 4 and will be discussed in detail later.

The operation is initiated by the control 16 in such a manner that first the value contained in register R is examined to determine whether it is greater than $$\frac{B^n}{2}-1$$

or smaller than $B^n/2$. If, as is assumed in the present example, a four-digit binary numerical system is used, it is possible, as is shown in FIGURES 3 and 4, to construct the comparer 14 in a particularly simple manner, since in this case it is only necessary to check for the presence of the 8-bit. For values of the operand in the R register smaller than eight, the operation proceeds along the lower branch. That means that first the content of the R register is decreased by one. Thereupon the presence of a carry CR is checked; if a carry is detected the sum is contained in the L register, the carry trigger TR may be reset and the operation terminated. If such a carry is not yet detected, $\overline{CR}$, the content of the L register is increased by one, and a new check is made to determine whether this step of operation in the L register has produced a carry CL. If that is the case, the result is contained in the R register. If, however, the convention is made that the result is to appear in the L register in all conditions, a transfer of the content stored in the R register to the L register is necessary. Therefore, the L register now contains the result. Then, the carry in the carry trigger TL is erased and the operation terminated. If this last mentioned step, the increase of the L register content by one, has not resulted in a carry $\overline{CL}$, the value of the operand in the R register is again reduced by one until a carry is first detected in either of the carry triggers TR or TL. As may also be seen from FIGURE 3, values of the R operand greater than seven also result in similar operating loops leading to the formation of the result.

FIGURE 4 illustrates the circuitry of an arrangement according to FIGURE 2 in more detail. In conjunction with FIGURE 5 which shows the pulse diagrams of four examples (I to IV), the functions of the control 16 will be explained below.

In Example I it is assumed that the R operand contains value nine, i.e., >7, the L operand containing the value zero. In FIGURE 3, the operational branch is designated I which is followed for conducting the arithmetic operation for this example. The four data bits of the operand have previously been entered via the inputs 38 and 39 (FIGURE 4) into the R and L registers respectively. The information on whether the R operand contains an 8-bit is transmitted through line 40 to the comparer 14. There, a combination of AND gates 41 to 43 examines the information transmitted via line 40 and at clock time $R_1$ sets a latch circuit 44 LT–8-bit. In the presence of the start signal START OP, applied to Start Latch 45, the corresponding output signal of the comparer is transmitted through the AND gates 46 and 47 to a series of AND gates 48 to 55. At the times indicated in FIGURE 5 below I, appropriate signals for increasing or decreasing the value in the R register by one or for increasing or decreasing the value in the L register by one or for the transfer of the R register value into the L register are transmitted through the lines 56 and 57 to the modifier 17 which realizes the corresponding control instructions together with a series of AND gates 58 to 61 and OR gates 62 to 68. The start signal on line 69 is first effective for setting the Start Latch 45 as well as for resetting the sum latch 70 which, in addition to indicating that the result is present in the L register, also has to perform other control functions as will be seen later. The start signal also resets a stop latch 71 STOP–LT, which had been set as a result of the preceding operations. Since at clock time $R_1$ all of the coincidence requirements for the AND circuit 46 are met, it will produce at its output the control signal indicating that the R operand is greater than seven. At the same clock time, the coincidence requirements for the AND circuit 48 are also met as a carry is not yet contained in any of the registers as represented by the output from OR circuit 76. The output signal of AND circuit 48 is transmitted via the OR circuit 67 to the modifier 17. All output signals of OR circuit 67 cause the modifier to reduce the value of the register connected thereto at that moment by one. The reduced value is formed in the modifier 17 and at the same clock time, if the coincidence requirement for the AND gate 59 is met, transmitted into the L register. The value now contained in the L register contains information on the presence of a borrow which through line 22 causes the carry trigger TL to be set. At the output the carry signal CL is produced which is transmitted through an OR circuit 72 to the AND circuit 52 and which together with the OR circuit 73 produces a transfer signal. Thus, the content of the R register is transferred to the L register at the same clock time. Through the OR circuit 74, the transfer signal also causes the sum latch 70 to be set. Once the sum latch 70 has been set, its output signal resets the carry triggers TR and TL and through the AND circuit 75 sets the stop latch 71. Therewith, the operation has been completed and the result is now stored in the L register. Since all steps of the operation are controlled by the pulses of the two clock sequences $R_1$ and $R_3$, the number of clock pulses required from the start of the addition to the end thereof is a measure for the required number of steps. As has been seen, in Example I, the first pulse of the clock sequence $R_1$ has already led to the result. Thus, the operation has been completed with one single step of operation.

Example II again is based on a value of the R operand greater than seven. The value in the L register is assumed to be two. In the light of the previous, and primarily considering the flow diagram in FIGURE 3, the result is expected to be obtained after the third step. The table which follows, presented in connection with FIGURE 5 for Example II, shows all of the necessary steps of operation and control functions to be performed by the add-subtract control for carrying through the operation. The same is also true for the Examples III and IV which in conjunction with FIGURE 5 explain the operation of the arrangement represented in FIGURE 4.

In the circuit arrangement of FIGURE 4, a delay circuit 77 which has not yet been referred to is inserted in the connecting line between the output of the OR gate 76 and the inputs of the AND gates 48 to 51. This circuit has the function to prevent the +1 or −1 signals from being applied to the modifier 17 after the initiation of the stopping process of the operation has been started by resetting the carry triggers. In this manner it is insured that the STOP latch 71 is already set and thus the arrangement stopped before additional +1 or −1 signals can act on the modifier 17.

The following table serves to indicate the Examples I to IV to represent the required control functions of the control 16. Numerals refer to outputs of AND or OR circuits.

TABLE

Example I: $(L)=0$; $(R)=9$ $(R)>7$ (1) Set START–LT→Reset Sum LT and STOP–LT
(2) Signal 46 because of coincidence of >7 and $R_1$
(3) Signal 48 because of coincidence of >7, $R_1$ and $\bar{c}\rightarrow L-1$—1st step
(4) Signal CL in TL
(5) Signal 52 because of coincidence of >7, $R_1$ and C
(6) Signal 73 Transfer $(R)\rightarrow L$
(7) Signal 74 Set Sum–LT→Reset TL→Signal $\bar{c}$
(8) Signal 75 because of coincidence of Sum–LT and $\bar{c}\rightarrow$
(9) Set STOP–TL→Reset START–LT Example II: $(L)=2$; $(R)=10$ $(R)>7$ (1) Set START–LT→Reset Sum–LT and STOP–LT
(2) Signal 46 because of coincidence of >7 and $R_1$
(3) Signal 48 because of coincidence of >7, R and $\bar{c}\rightarrow L-1$ } 1st step
(4) Signal 50 because of coincidence of >7, $R_3$ and $\bar{c}\rightarrow R+1$ } 1st step
(5) Signal 48 $\rightarrow L-1$ } 2nd step
(6) Signal 50 $\rightarrow R+1$ } 2nd step
(7) Signal 48 $\rightarrow L-1$—3rd step
(8) Signal CL in TL
(9) Signal 52 because of coincidence of >7, $R_1$ and $c$
(10) Signal 73 Transfer $(R)\rightarrow L$
(11) Signal 74 Sum–LT→Reset TL→Signal $\bar{c}$
(12) Signal 75 because of coincidence of Sum–LT and $\bar{c}\rightarrow$
(13) Set STOP–LT→Reset START–LT.

Example III: $(L)=8$; $(R)=0$ $(R)<8$ (1) Set START–LT→Reset Sum–LT and STOP–LT
(2) Signal 47 because of coincidence of <8 and $R_1$
(3) Signal 49 because of coincidence of <8, $R_1$ and $\bar{c}\rightarrow R-1$—1st step
(4) Signal CL in TR
(5) Signal 53 because of coincidence of <8, $R_3$ and $c$
(6) Signal 73 Transfer $(R)\rightarrow L$
(7) Signal 74 Set Sum–LT→Reset TR→Signal $\bar{c}$
(8) Signal 75 because of coincidence of Sum–LT and $\bar{c}\rightarrow$
(9) Set STOP–LT→Reset START–LT.

Figure 6:
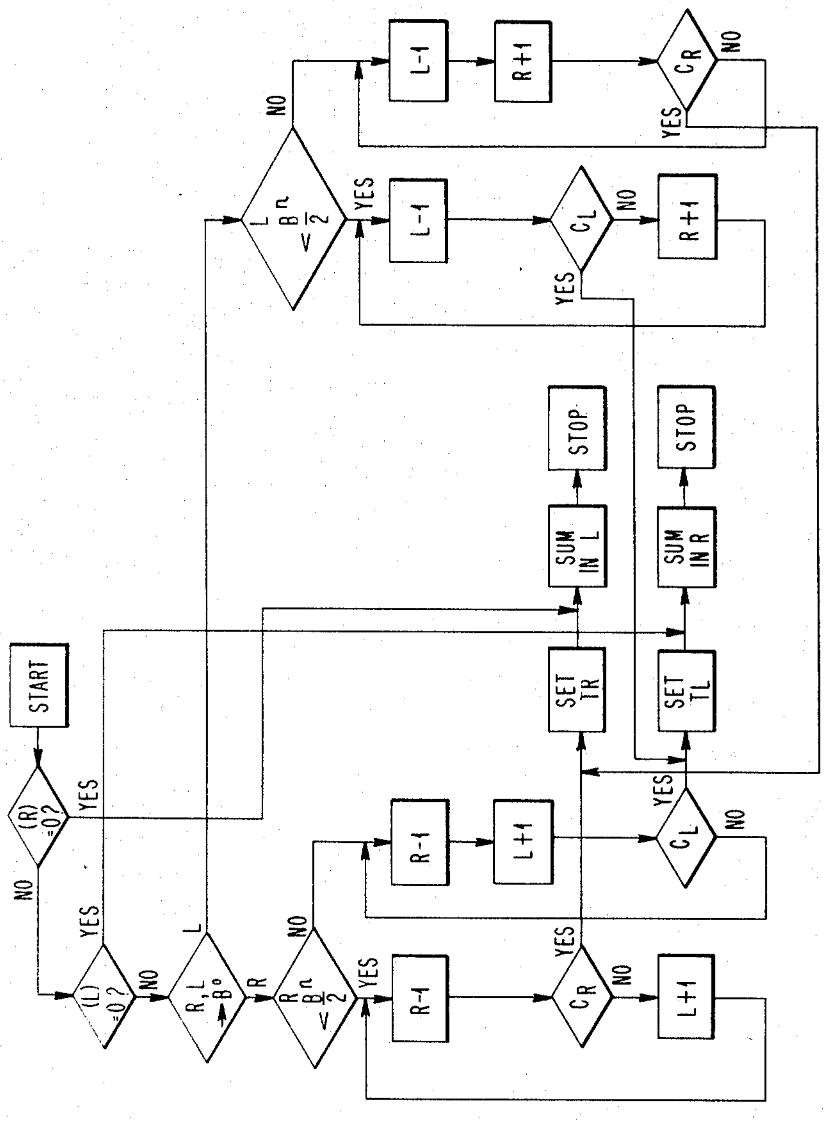
FIGURE 6 represents the sequence of operation for an arrangement according to modifications to FIGURE 1 and FIGURE 2.

Example IV: $(L)=8$; $(R)=2$ $(R)<8$ (1) Set START–LT→Reset Sum–LT and STOP–LT
(2) Signal 47 because of coincidence of <8 and $R_1$
(3) Signal 49 because of coincidence of <8, $R_1$ and $\bar{c}\rightarrow R-1$ } 1st step
(4) Signal 51 because of coincidence of <8, $R_2$ and $\bar{c}\rightarrow L+1$ } 1st step
(5) Signal 49 $\rightarrow R-1$ } 2nd step
(6) Signal 51 $\rightarrow L+1$ } 2nd step
(7) Signal 49 $\rightarrow R-1$—3rd step
(8) Signal CR in TR
(9) Signal 53 because of coincidence of <8, $R_3$ and $c$
(10) Signal 78 Transfer $(R)\rightarrow L$
(11) Signal 74 Set Sum–LT→Reset TR→Signal $\bar{c}$
(12) Signal 75 because of coincidence of Sum–LT and $\bar{c}$
(13) Set STOP–LT→Reset START–LT A detailed description of one form of the invention has been shown in connection with FIGURES 2–5. The basic concept of the invention is the determination of which of two operands should be incremented and which should be decremented until a carry or borrow is produced in either operand. FIGURE 6 represents a sequence of steps required if the apparatus of FIGURES 1 and 2 were modified. Logic would be provided to detect if either operand were zero. If not, the two operands are compared with $B^0$ to determine which is smaller. After this decision the operation proceeds in accordance with apparatus like that of FIGURE 4 wherein the determination is made of the value of the operand relative to $B^n/2$.

It should also be apparent to those skilled in the art that larger operands than 4 binary bits can be added. Also, means can be provided to cause sequential handling of 4-bit groups in FIGURE 4. An analysis of the inventive technique will reveal that carries to a succeeding 4-bit group should be made when the carry C is detected in the register R or L which is being incremented.

What is claimed:

1. Apparatus for adding numbers comprising:
first and second means for manifesting the value of two operands to be added;
magnitude signalling means connected and responsive to said manifesting means for producing signals prior to addition indicative of the magnitude of the value of at least one operand relative to the lowest and highest value that can be manifested;
means connected to said first and second manifesting means for selectively incrementing the value of the operands manifested thereby;
means connected to said first and second manifesting means for selectively decrementing the value of the operands manifested thereby;
control means connected and responsive to the output of said magnitude signalling means for controlling said incrementer and said decrementer to thereby selectively increment the value in said first manifesting means and decrement the value in said second manifesting means or decrement the value in said first manifesting means and increment the value in said second manifesting means;
and means operative in response to a value manifestation of zero in either said first or second manifesting means for inhibiting the operation of said control means for utilizing the value manifestation in the other of said manifesting means as the sum of the numbers to be added.

2. Apparatus in accordance with claim 1 wherein:
said magnitude signalling means includes,
means responsive to the value of said one operand for producing a first signal when the value is greater than one-half the highest value and a second signal when the value is less than one-half the highest value that can be manifested;
and said control means includes,
means responsive to said first signal for incrementing the value of said one operand while decrementing the value of the other operand;
and means responsive to said second signal for decrementing the value of said one operand while incrementing the value of the other operand.

3. Apparatus in accordance with claim 2 wherein:
said first and second manifesting means are comprised of,
a plurality of binary digit value registering means;
and said means for producing said first or second signals from said magnitude signalling means includes,
means connected to the highest order of said plurality of registering means responsive to a binary value of 1 or 0 respectively.

4. Apparatus in accordance with claim 3 wherein:
said control inhibiting means includes,
one additional binary value registering means connected to the highest order registering means of each of said manifesting means for registering a binary 1 in the presence of a carry from said highest order when incrementing and a borrow when decrementing.

References Cited

UNITED STATES PATENTS

| | | | |
|---|---|---|---|
| 2,949,228 | 8/1960 | Bailey et al. | 235—92 |
| 3,268,713 | 8/1966 | Klinikowski | 235—92 |
| 3,159,740 | 12/1964 | Broce | 235—169 |

MALCOLM A. MORRISON, *Primary Examiner.*

V. SIBER, *Assistant Examiner.*